United States Patent [19]

Teeny et al.

[11] 4,073,261
[45] Feb. 14, 1978

[54] ARTICLE MOISTENER

[76] Inventors: Samuel J. Teeny; Parry S. Teeny, both of 1210 SE. 179th, Portland, Oreg. 97233

[21] Appl. No.: 726,829

[22] Filed: Sept. 27, 1976

[51] Int. Cl.² ............................. B05C 1/02; B05C 5/00
[52] U.S. Cl. ....................................... 118/16; 118/13; 118/24
[58] Field of Search ..................... 118/16, 24, 13, 213, 118/262, 231; 101/120; 99/516

[56] References Cited

U.S. PATENT DOCUMENTS

| | | | |
|---|---|---|---|
| 557,056 | 3/1896 | Dejonge, Jr. | 118/231 |
| 739,497 | 9/1903 | Klaber | 101/120 |
| 2,056,273 | 10/1936 | Holdsworth | 118/213 X |
| 2,522,847 | 9/1950 | Stiles | 118/13 |
| 2,731,942 | 1/1956 | Anderson | 118/16 |
| 3,718,080 | 2/1973 | Yamamoto et al. | 118/260 X |

Primary Examiner—John P. McIntosh
Attorney, Agent, or Firm—Kolisch, Hartwell, Dickinson & Stuart

[57] ABSTRACT

Apparatus for applying liquid to one side of a substantially flat article includes a power-driven, rotatably journaled drum having a perforate, cylindrical surface. Within the interior of the drum is disposed a roller. The roller includes a resilient, absorbent surface which engages the inside surface of the drum such that rotation of the drum imparts relative rotation to the roller. The roller is rotatable through a liquid reservoir and a pressure member is selectively operable to press or urge the perforate surface against the roller such that liquid picked up by the roller is squeezed through the perforations. An article contacting the drum surface will thereby have liquid applied to one side thereof.

11 Claims, 3 Drawing Figures

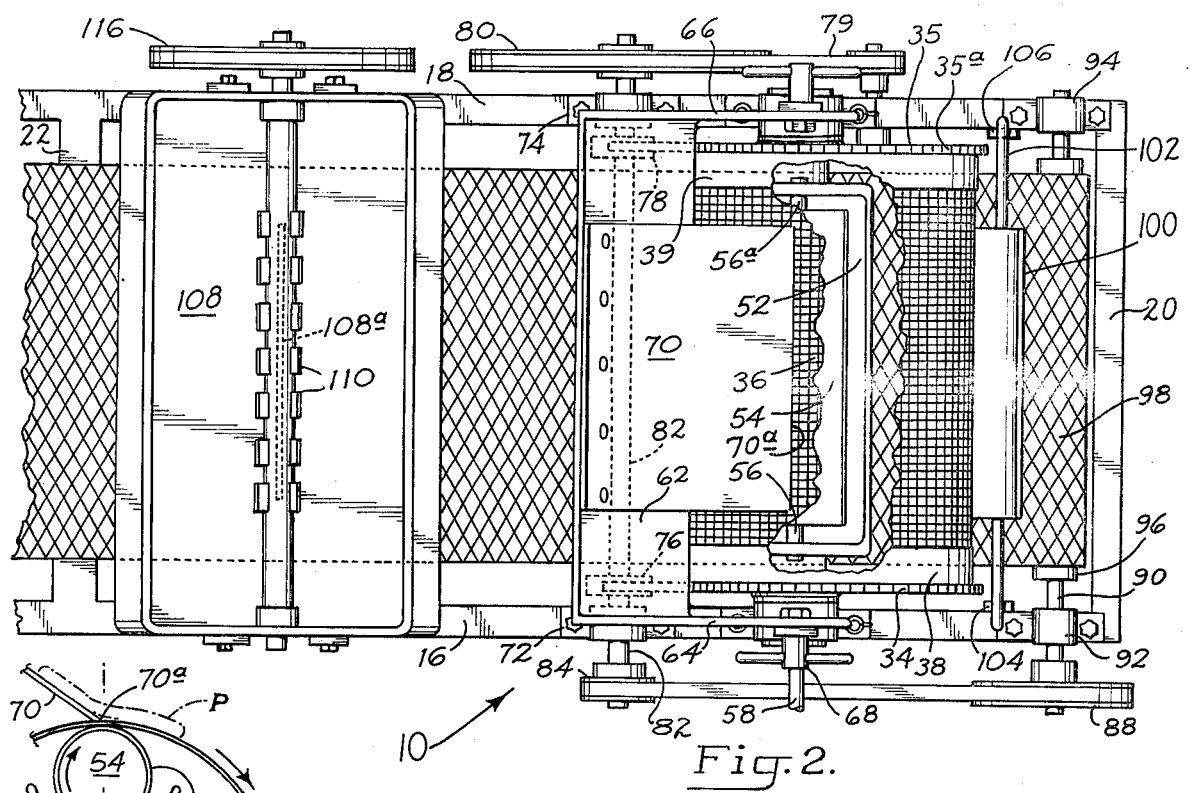
Fig. 2.
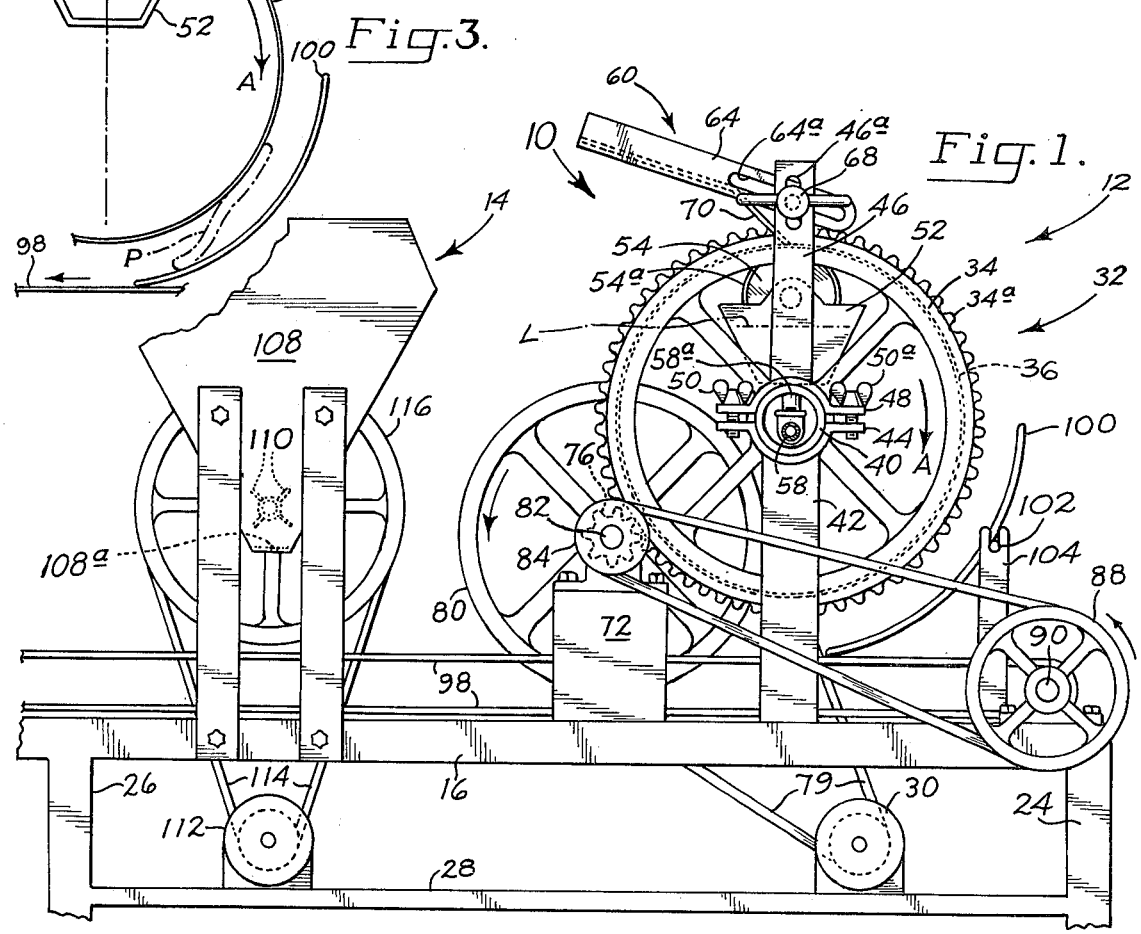
Fig. 3.
Fig. 1.

ARTICLE MOISTENER

BACKGROUND AND SUMMARY OF THE INVENTION

The present invention relates to devices for coating one side of an article with liquids, and more particularly to a rotatable drum having an internal liquid pickup roller in which a pressure member is arranged to selectively squeeze liquid from the roller through perforations in the drum surface.

In various manufacturing processes it is desirable to coat one side of an article with a liquid. For instance, in the bakery industry, it is desirable in the production of certain types of breads or pastries to moisten one side of a flattened dough patty with liquid so that sesame seeds or other material may be readily dispensed onto the liquid covered side for adherence thereto.

A problem resides in the application of the proper amount of liquid to the patty surface to be moistened. If too much liquid is applied, the seed material will not properly adhere and the dough will not adequately cook in an oven because of the excess moisture. On the other hand, if sufficient liquid is not applied to the patty surface, sufficient moisture will not be present on the patty surface to which the material can adhere. Furthermore, problems in the subsequent baking of the bread may also result. It is apparent that the application of a proper amount of liquid to a patty surface is required in order to ensure an adequate adhesive bond and to also ensure that the baking of the bread is not inhibited by too much or too little moisture.

Accordingly, it is an object of the present invention to provide a liquid or moisture applying apparatus which will apply only selected amounts of liquid to a patty surface. To this end, the present invention provides a power-driven rotatable drum having a perforate cylindrical surface within which is disposed an inner roller having a resilient surface. The inner roller is constructed of liquid absorbent material and is partially disposed within a liquid reservoir so that its surface contacts the inside of the perforate surface of the rotatable drum. As the drum rotates, it imparts relative rotation to the inner roller which picks up liquid from the reservoir for subsequent pressing through the perforate surface of the drum onto the outer surface of the drum.

Thus, as a somewhat flattened article, such as a dough patty, is transferred to the drum surface, the under side of the patty becomes coated with liquid. As the patty continues to travel around the drum, it will eventually fall off, as for instance onto a roller conveyor, so that the coated surface is directed to face upwardly. The patty may then be conveyed beneath a seed or other material applicator whereupon the material is sprinkled onto the moistened patty surface. The seed material will thereby stick to the surface due to the adhesive characteristics of a properly moistened patty and the patty may then be transferred to an oven for baking.

An important feature of the present invention is the provision of an adjustable pressure member positionable against the perforate drum surface for selectively pressing the surface against the inner roller to control or meter the amount of liquid squeezed from the resilient surface of the inner roller through the permeable drum material. The pressure member includes a blade having an edge which is adjustably positioned against the drum surface for applying pressure thereagainst. As a patty slides down the member and onto the drum surface, the underside of the patty will pass over the inner roller and become moistened or liquid-coated.

By selectively varying the pressure of the blade member on the drum surface and inner roller, the amount of liquid squeezed from the inner roller may be accurately controlled as specific requirements dictate.

Another object of the present invention is to provide a drum which is rotatable upon a fixed shaft or tube, wherein the tube supports the aforementioned reservoir. The inner roller is journaled on the reservoir and positioned to be at least partially immersed within the liquid in the reservoir. The tube provides a passageway through which liquid may be transported to the reservoir so that liquid may be continuously maintained in the reservoir.

Another object of the present invention is to provide a rotatable drum having a permeable or perforate surface which may be readily disassembled so that component parts of the drum and the inner roller assembly may be readily cleaned.

These and other objects and attendant advantages will become apparent as further consideration is given to the following detailed description and accompanying drawings.

BRIEF DESCRIPTION OF THE DRAWINGS

Novel features of the improved article moistening device in accordance with the present invention will be more readily understood from a consideration of the following description, taken together with the accompanying drawings, in which a preferred embodiment is illustrated with the various parts thereof identified by suitable reference characters in each of the views, and in which:

FIG. 1 is a side elevation view of an assembly including the liquid applicator apparatus of the present invention and a seed material applicator;

FIG. 2 is a top plan view of the assembly illustrated in FIG. 1; and

FIG. 3 is a schematic view of the rotatable drum and inner roller illustrating the application of liquid to the under side of an article such as a dough patty.

DETAILED DESCRIPTION OF THE INVENTION

Turning to the drawings and referring initially to FIGS. 1 and 2, there is generally designated at 10 an assembly which includes an article moisture applying apparatus or applicator 12 and a seed material applicator 14.

The assembly 10 is mounted upon a frame which includes longitudinal frame members 16, 18 interconnected by cross members 20, 22. Upright members 24, 26 (including upright members hidden in FIGS. 1 and 2) elevate the assembly 10 above the ground. The upright frame members 24, 26, etc. may be provided with wheels at their lower ends so that the assembly 10 is portable. As shown in FIGS. 1 and 2, only a portion of the frame structure is illustrated and may be of a length necessary to satisfy certain production requirements.

Additional frame members such as frame member 28 may be provided to support component parts of the assembly 10 such as a drive motor 30. The function of drive motor 30 will be more detailed at a later point.

The applicator 12 includes an elongate drum generally designated at 32. The drum 32 includes two laterally opposed sprocket members 34, 35 each of which includes a plurality of circumferentially disposed gear teeth 34a, 35a, respectively. The drum 32 is provided with a permeable or perforate outer cylindrical surface 36. For instance, the surface 36, as shown, is constructed of a wire mesh. Clamp rings 38, 39 secure the wire mesh to the sprockets 34, 35, respectively.

The sprockets 34, 35 are rotatably journaled upon a hollow shaft or tube 40. The tube 40 is disposed above the plane of the frame by means of upright bracket members which are disposed on either side of the sprockets 34, 35. For instance, considering FIG. 1, an upright bracket member 42 is secured to the frame member 16 and includes a U-shaped clamp 44. Disposed above the tube 40 is another upright bracket member 46 having an associated generally U-shaped clamp 48. The clamp members 44, 48 may be rigidly secured about the tube 40 by means of associated screws or bolts 50, 50a. A similar upright and clamp construction is arranged on the other side of the drum 32 as seen in FIG. 1 for supporting the tube 40. By providing the clamps 50, 50a, etc., and their associated uprights, the tube 40 may be nonrotatably and rigidly secured to the frame members 16, 18. Thus, the drum 32 is rotatably journaled upon the tube 40. The sprockets 34, 35 are provided with suitable bearings to facilitate rotation.

Disposed in the interior of the drum 32 is a reservoir 52 mounted on top of the tube 40. Journaled to the reservoir is an inner roller means 54 which includes a resilient surface of liquid absorbent material 54a. The roller 54 includes shafts 56, 56a which are rotatably mounted to the reservoir 52. Liquid is maintained and transferred into the reservoir 52 by means of a conduit 58 which is connected to an external liquid supply and extends through the tube 40 for discharge through an extension 58a into the reservoir 52. The liquid level is indicated at L.

The roller 54 is positioned within the interior of the drum 32 such that the inner surface of the mesh 36 contacts the outer surface 54a. Thus, as the drum 32 is rotated, the mesh 36 will impart relative rotation to the roller 54. It can be appreciated that if the roller 54 is at least partially immersed within liquid contained by the reservoir 52, liquid will be picked up by the absorbent material of surface 54a and will be transferred through the perforations in the mesh 36 onto the mesh's outer surface. The amount of liquid actually transferred through the perforations of the mesh 36 will depend upon the relative pressure of the mesh 36 upon the resilient surface 54a of the roller 54.

In order to vary the aforementioned pressure, and therefore regulate the amount of liquid actually transferred or squeezed from the surface 54a of the roller 54 through the mesh 36, there is provided a pressure adjustment or liquid regulating means generally designated at 60. The liquid regulating means 60 includes a guide means such as a tray or chute 62 for guiding a flat article onto drum 32. Adjustment is provided by means of arms 64, 66 which are adjustably connected to the aforementioned associated upright members 46, etc. on either side of the drum 32. For instance, the arm 64 includes an elongate slot 64a which receives a tightening clamp 68 inserted through slot 46a. Thus, it can be appreciated that the relative angle of the chute 62 may be selectively positioned with respect to the drum 32 and the mesh 36.

Connected to the chute 62 is a pressure member or blade 70. The blade 70 is arranged to contact the mesh 36 along an edge 70a at a position above or slightly to the rear of the region of contact of the roller surface 54a and the mesh 36. This construction is clearly shown in FIGS. 1 and 2 as well as FIG. 3. By varying the relative angle of the blade 70 with respect to the drum 32, blade pressure against the mesh 36 and the roller surface 54a may be selectively controlled. For instance, a greater pressure will squeeze more liquid from the resilient, absorbent roller surface 54a through the perforations in the mesh 36 when the drum 32 and the roller 54 are relatively rotated. Accordingly, the amount of liquid transferred may be accurately regulated.

In order to impart rotation to the drum 32 and the roller 54, the following construction is provided. Mounted to the frame members 16, 18 are supports 72, 74 upon which are mounted cogs 76, 78, respectively. The cogs 76, 78 are operatively meshed with the gear sprockets 34, 35, respectively. A motor 30 is mounted beneath the frame members 16, 18 and includes a sprocket and drive for operatively driving sprocket or fly wheel 80 by means of a belt 79. The fly wheel 80 includes a shaft 82 connected to the cogs 76, 78. Thus, as the belt 79 is driven, rotation is imparted to the cogs 76, 78 for providing relative rotation to the drum 32.

Extending on the shaft 82 from the cog 76 is another pulley 84. The pulley 84 is interconnected by means of a belt 86 to a pulley 88. The pulley 88 rotatably drives a shaft 90. The shaft 90 is appropriately journaled by means of bearing clamps 92, 94 to the frame members 16, 18 respectively. A conveyor roller 96 is rotatably driven by the shaft 90.

The conveyor roller 96 drives a conveyor belt or screen 98. The screen 98 is an endless belt and is connected to another roller to the left of FIGS. 1 and 2 (not shown). Also connected to the frame members 16, 18 is a curved guide member 100 which is supported by means of a connected rod 102 in associated frame mounted uprights 104, 106.

Shown to the left of FIGS. 1 and 2 is the aforementioned seed or material applicator 14. The applicator 14 includes a bin or hopper 108 which is disposed above the frame by means of appropriate upright supports as illustrated. Adjacent the bottom of the hopper 108 is a rotatable agitator or paddle shaft 110 journaled therein and operable for stirring seed material such that same may be passed downwardly through an opening or slot 108a in the hopper 108. A motor 112 is connected by means of a belt 114 to pulley 116 for rotating the paddle shaft 110.

OPERATION OF THE LIQUID APPLYING APPARATUS

The following description will detail how liquid is applied to the under side of a substantially flat article, such as a dough patty. While the following description refers to such a dough patty, it must be remembered that the present invention could be utilized to apply selected amounts of liquid onto any somewhat flexible, substantially flat article.

Initially, the assembly 10 is positioned beneath a conveyor or other transporting means and the tray 62 is positioned to receive the dough patties. The motor 30 is then actuated so that the drum sprockets 34, 35 are rotated in the direction of arrow A. The roller 54 is also thereby rotated. The blade 70 is then adjusted so that liquid picked up from the reservoir 52 by means of the roller surface 54a of the roller 54 is squeezed through the perforations onto the top surface of the mesh 36. Depending upon requirements, the blade 70 is positioned so that a certain required amount of water is ejected.

With directed to FIG. 3, it can be seen that a patty, designated at P, will slide down the inclined blade 70 of the chute 62 for contact with the rotating mesh 36. Because of the position of the blade 70 with respect to the roller 54, the patty P will initially strike the wire mesh 36 at a region where the water is being squeezed from the roller 54 onto the top surface of the mesh 36. Thus, the bottom of the patty P will become totally covered with liquid from the reservoir 52 as the patty P becomes completely seated on the mesh 36. The patty P will tend to cling or stick somewhat to the mesh 36 as it is moved in the direction of arrow A. However, at some point, gravity will overcome the adhesiveness existing between the mesh 36 and the patty P so that the patty P will fall 36 as shown at the bottom of FIG. 3. At this point, the guide member 100 ensures that the patty will slide onto the conveying screen 98 with the liquid covered or moistened side of the patty directed upwardly.

The patty P continues its travel along the conveying screen 98 to a region beneath the hopper 108, and assuming that motor 112 has been actuated, seeds or other material will be sprinkled onto the moistened patty surface. The seeds will stick to the patty surface and not be jostled therefrom during subsequent transport to a baking oven. This process is repeated as a whole series of patties are moved continuously down the blade 70 onto the wire mesh 36.

There are several distinct advantages which reside in the specific construction of the present invention. For instance, the roller 54 is provided with a somewhat resilient and liquid absorbent surface 54a which permits the permeable or mesh surface 36 to be compressed downwardly against the roller 54 such that water will be readily pushed or squeezed through the mesh or perforate surface depending upon the relative pressure of the blade 70. As the blade 70 is adjusted to press downwardly against the mesh 36 and the roller surface 54a, it is readily apparent that selected amounts of liquid will be transferred upwardly through the mesh surface during rotation of the drum 32. Correspondingly, as pressure is decreased relative the end of the blade 70 and the mesh 36, the mesh will not be urged so tightly against the roller surface 54a of the roller 54 and therefore less water will be squeezed through the perforations of the mesh 36.

The adjustability features of the blade member 70 and the arms 64, 66 enable the blade 70 to be operable for selectively increasing or decreasing the amount of pressure that the blade 70 exerts against the mesh 36 and the roller surface 54a. Correspondingly, the amount of liquid transferred to the outer surface of the mesh 36 is selectively regulated. Depending upon the particular qualities of an article to be moistened, the present invention provides a quick and accurate way of selectively altering the amount of the liquid which is transferred to the underneath side of a substantially flat article.

Furthermore, it must be appreciated that the present invention provides a unique way of journaling a rotatable drum upon a shaft or hollow tube, such as the tube 40. Liquid may be transported through the stationary tube 40 and transferred into the reservoir 52. The reservoir 52 is entirely contained within the interior of the drum 32 and is rigidly supported upon the stationary tube 40. The stationary tube 40 is maintained in position by uprights which may be readily disconnected one from another such that the entire assembly may be disassembled for cleaning or repair.

While it is necessary to apply the proper amount of moisture to a flattened article such as a patty for application of seed or other material, it may also be important to apply only a proper amount of moisture if the article is to undergo subsequent treatment, such as baking. For instance, proper baking requires a predetermined amount of moisture content on a dough patty. Thus, the present invention, by providing selective pressure against a liquid pickup roller 54, ensures that selective amounts of liquid may be applied to a patty surface.

Another important feature of the present invention resides in the fact that the moisture applying apparatus requires a minimal amount of space and therefore may be placed in relatively close proximity to a seed or material dispensing device for application of seed or material onto a moistened surface. This becomes important when it is realized that if some distance of travel were required between the moistening apparatus and the material application apparatus, the moistened article may tend to dry out. This is especially apparent in industries such as bakeries where temperatures within the bakery environments are relatively high and thus could cause significant evaporation of moisture from articles such as dough patties.

While the invention has been particularly shown and described with reference to the foregoing preferred embodiment, it will be understood by those skilled in the art that other changes in form and detail may be made herein without departing from the spirit and scope of the invention as defined in the appended claims.

It is claimed and desired to be secured by Letters Patent:

1. Apparatus for applying liquid to one side of a substantially flat article comprising:
    power-driven drum means rotatable about a generally horizontal axis and having a perforate, cylindrical surface for receiving an article on the surface and transporting it for a portion of a drum revolution;
    roller means rotatably disposed within the interior of said drum means and adapted to receive liquid, said roller means arranged for continuous contact with the inside of said cylindrical surface so that rotation of said drum means imparts relative rotation to said roller means; and
    liquid regulating means including a pressure member operable for pressing a portion of said cylindrical surface against said roller means to selectively squeeze and thereby transfer liquid from said roller means to the outside of said cylindrical surface, said liquid regulating means also including guide means for guiding the article onto said cylindrical surface.

2. The apparatus of claim 1 wherein said roller means includes a generally resilient surface comprising liquid absorbent material for contacting the inside of said cylindrical surface, said roller means having its longitudinal axis generally parallel to the longitudinal axis of said drum means.

3. The apparatus of claim 2 wherein said drum means includes laterally opposed sprocket members rotatably journaled upon a rigidly supported, nonrotatable tube.

4. The apparatus of claim 3 wherein a liquid reservoir is supported by said tube within the interior of said drum means, said roller means being disposed adjacent to said reservoir such that upon rotation of said drum means said roller means is operatively rotated through said reservoir to thereby pick up liquid.

5. Apparatus for applying liquid to one side of a substantially flat article comprising:
   power-driven drum means rotatable about a generally horizontal axis and having a perforate cylindrical surface for receiving an article on the surface and transporting it for a portion of a drum revolution;
   roller means including a generally resilient surface of liquid absorbent material rotatably disposed within the interior of said drum means, said roller means continuously contacting a portion of the inside of said cylindrical surface so that rotation of said drum means imparts relative rotation to said roller means; and
   means for regulating the amount of liquid transferred from said roller means to the outside of said cylindrical surface comprising a pressure member operable for pressing said cylindrical surface against said roller means and said absorbent material to selectively squeeze and transfer liquid from said roller means through said perforate cylindrical surface so that an article being received by said drum means is liquid coated on one side thereof.

6. The apparatus of claim 5 wherein said drum means includes laterally opposed sprocket members rotatably journaled upon a rigidly supported, nonrotatable tube, said tube being supported at opposite ends thereof by removable clamp bracket members, each of said bracket members including means for selectively adjusting the amount of pressure said pressure member exerts against said cylindrical surface and said roller means.

7. The apparatus of claim 6 wherein said pressure member is connected to a guide chute for receiving articles prior to the articles being received on said drum means.

8. The apparatus of claim 6 wherein said drum means is disposed above a conveying means, said conveying means arranged to receive articles from said drum means such that the liquid coated side is transported facing upwardly.

9. The apparatus of claim 8 wherein a material applying means is disposed adjacent to said drum means and is arranged for depositing material onto the liquid coated side of an article after the article has been transferred from said drum means to said conveying means.

10. The apparatus of claim 6 wherein a liquid reservoir is supported by said tube within the interior of said drum means, said roller means being disposed adjacent to said reservoir so that upon rotation of said drum means said roller means is operatively rotated through said reservoir to thereby pick up liquid.

11. The apparatus of claim 10 wherein said tube provides a means by which liquid may be supplied to said reservoir.

* * * * *